United States Patent [19]
Ekholm

[11] 4,009,630
[45] Mar. 1, 1977

[54] DEVICE WITH MOVABLE END STOP MEANS FOR PIECES OF LUMBER TO BE CUT INTO SHORTER PIECES

[75] Inventor: Rolf Ekholm, Nyland, Sweden

[73] Assignee: AB Hammars Mekaniska Verkstad, Nyland, Sweden

[22] Filed: Sept. 19, 1975

[21] Appl. No.: 614,844

[30] Foreign Application Priority Data

Oct. 7, 1974 Sweden ............................. 7412582

[52] U.S. Cl. ................................. 83/369; 83/393; 83/467 R; 269/304; 269/320
[51] Int. Cl.$^2$ ................ B26D 5/28; B26D 7/16
[58] Field of Search ............ 83/268, 269, 391, 393, 83/467, 467 A, 468; 269/297–301, 303, 304, 319, 320

[56] References Cited

UNITED STATES PATENTS

| 3,370,494 | 2/1968 | Schenck | 83/467 X |
| 3,605,540 | 9/1971 | Williams et al. | 83/269 X |
| 3,793,916 | 2/1974 | Jarman | 83/467 X |
| 3,813,980 | 6/1974 | Rand et al. | 83/467 |

*Primary Examiner*—Travis S. McGehee
*Attorney, Agent, or Firm*—Silverman & Cass, Ltd.

[57] ABSTRACT

A longitudinal lumber conveyor is provided with an adjustable end stop for cutting a piece of lumber into several pieces. The adjustable end stop is mounted on a slide which is adjustable hydraulically beneath the plane of the conveyor. The slide is operable between adjustable end switches which are activated to indicate the desired position of the slide. The slide may be moved between the various end positions when a photocell device mounted on the slide senses that a piece of lumber is not present at the photocell device. The slide has rotatable stop arms mounted on a shaft of the slide which are hydraulically rotatable from a first stop position above the plane of the conveyor to a second position below the plane.

4 Claims, 5 Drawing Figures

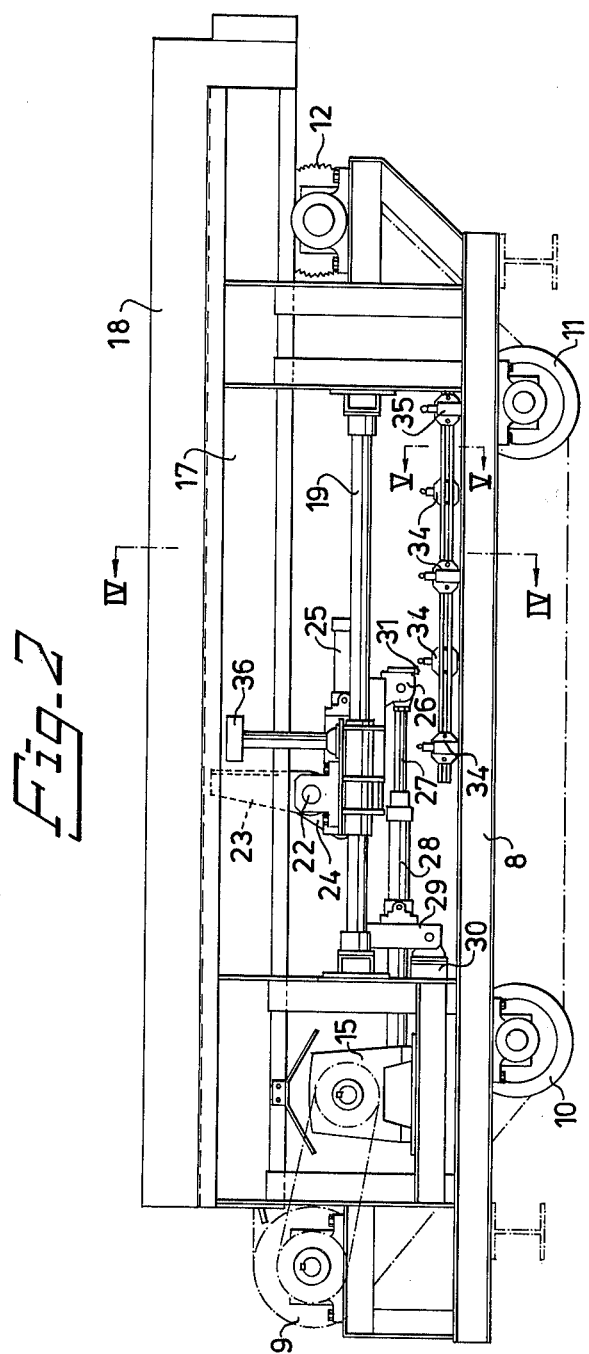

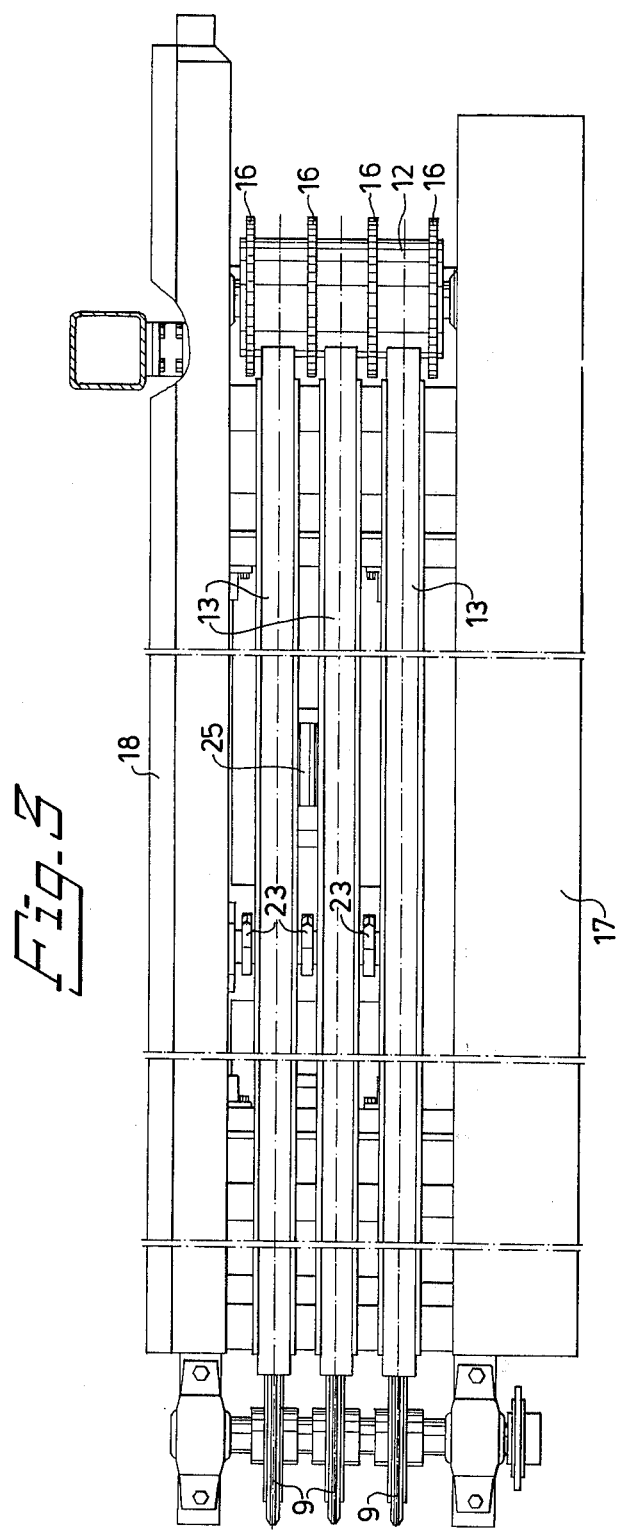

DEVICE WITH MOVABLE END STOP MEANS FOR PIECES OF LUMBER TO BE CUT INTO SHORTER PIECES

BACKGROUND OF THE INVENTION

A device with movable end stop means for pieces of lumber to be cut into shorter pieces.

The present invention relates to a device with movable end stop means for pieces of lumber to be cut into shorter pieces. It is a further object of the invention to make it possible to let the device be a part of and operate in a lumber processing plant having a high operation speed.

The invention relates to a device with a conveyor for longitudinal feeding of pieces of lumber, and saw means for cutting the pieces of lumber into several pieces. The device according to the invention is characterized by the fact, that an end stop device for the pieces of lumber is arranged displaceably in the longitudinal direction of the conveyor and attachable in predetermined positions, and that an end stop means comprised in said end stop device for engagement of the first end of a piece of lumber, as seen in the feeding direction, is movable into and out of a stop position for the piece of lumber. Furthermore, said end stop device carries an actuation means for cooperation with preferably several end position switches to stop the displacement of said end stop device, said end position switches being adjustable in the longitudinal direction of the conveyor.

The invention will be illustrated by an embodiment shown on the attached drawings as an example.

FIG. 2 shows on a greater scale a side view of the device according to the invention.

FIG. 3 shows a plan view of the device of FIG. 2.

Figure 1:
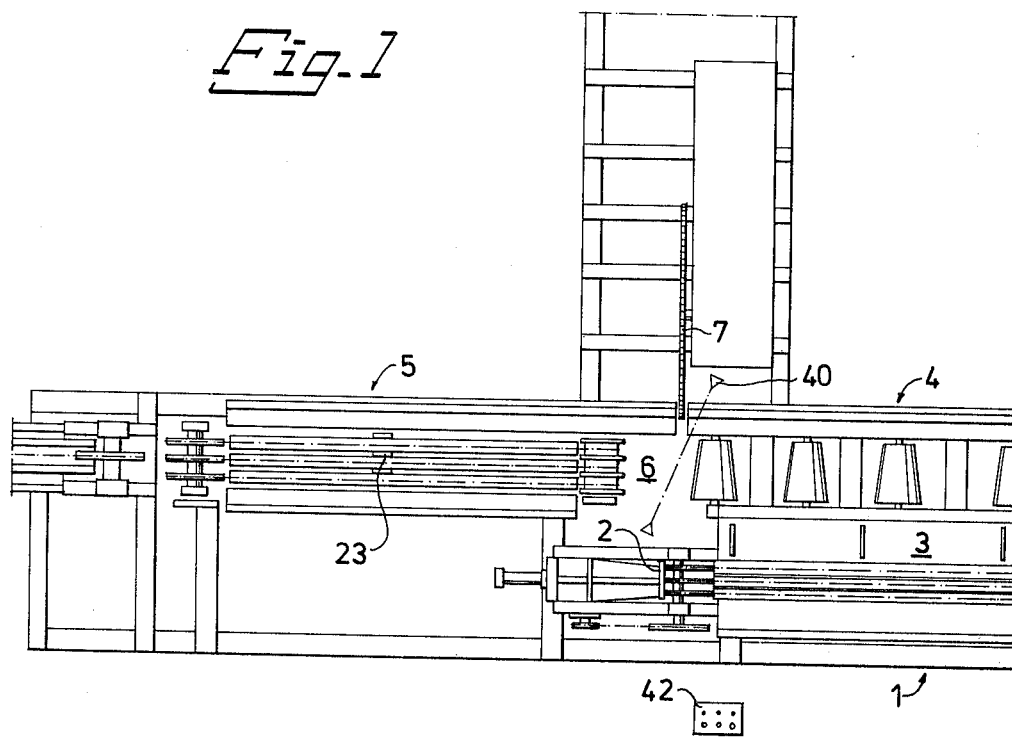
FIG. 1 shows schematically a plan view of a part of a lumber processing plant comprising the device according to the invention.

In the part shown in FIG. 1 of a lumber processing plant there is shown a part of a chain conveyor 1 having an adjustable end stop 2, and a plane 3 located along one side of said chain conveyor 1, said plane 3 being inclined downwards to a roller conveyor 4, and a further chain conveyor 5 aligned with said roller conveyor 4. Between the roller conveyor 4 and the chain conveyor 5 there is a gap 6, in which a saw-means in form of a saw blade 7 is arranged to be displaceable in its own plane.

Figure 4:
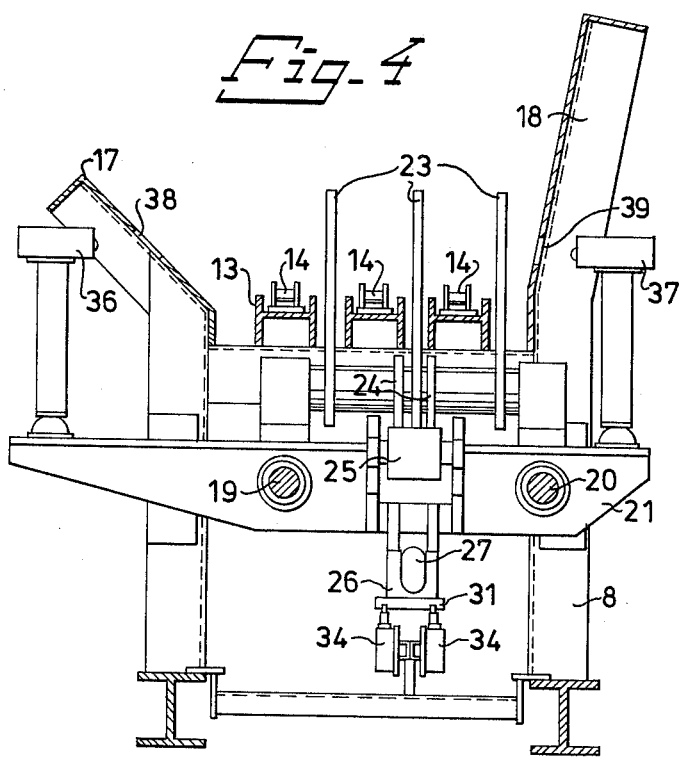
FIG. 4 shows a cross section at the line 1V—1V in FIG. 2.

The chain conveyor 5 is illustrated more clearly in FIGS. 2–4. It comprises a frame 8 supporting chain wheels 9 and chain rolls 10, 11, 12. Endless chains 14 run over said wheel and rolls and also in U-shaped rails 13. An electric motor 15 mounted in the frame 8 is drivingly connected to the chain wheels 9. The chain roll 12 carries a tooth wheel 16 at each side of the chains 14 running on the chain roll 12. The frame 8 is provided with side walls 17 and 18 at each side of the conveyor formed by the upper chain portions.

Two guiding means 19 and 20 are attached to the frame 8 parallel to the rails 13 in the longitudinal direction of the chain conveyor 5. Said guiding means 19,20 support a slide 21, which is slidable along the guiding means. A shaft 22 is rotatably journalled on said slide, said shaft lying in the transverse direction of the conveyor 5. Three end stop arms 23 as well as two downwardly projecting operating arms 24 are fastened to said shaft 22. Said operating arms 24 are connected to the piston rod of a hydraulic device 25, by which the operating arms can be swung, so that the shaft 22 will be rotated. Thereby the stop arms 23 will be swung between a position, the stop position, in which they project vertically above the chains 14 running in the rails 13, and a second position below said chains.

The slide 21 is at its underside provided with an attachment 26, to which a piston rod 27 in a hydraulic cylinder 28 is connected. The bottom end of said cylinder 28 is swingably connected to a cradle 29 supported by the frame 8 by a vibration damping member 30. Consequently the slide 21 is slidable along the guiding means 19,20 by the hydraulic device 27,28.

Figure 5:
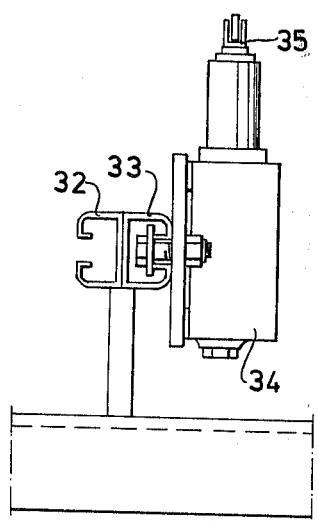
FIG. 5 shows on a greater scale a cross section at the line V—V in FIG. 2.

A ledge-shaped actuating means 31 is mounted at the attachment 26. A little under the attachment 26 and parallel to the movement direction thereof, that is in the longitudinal direction of the conveyor 5, or parallel to the guiding means 19,20, the frame 8 carries two rails 32,33 having a cross section shown in FIG. 5. At each of said rails 32,33 end position switches (micro switches) 34 are displaceably but attachably arranged, whereby the operating means 35 of the switches 34 can be actuated by the actuating means 31 when this is displaced. At one rail 32 three end position switches 34 are arranged according to FIG. 3, and at the other rail 33 two end position switches 34 are arranged, and the switches of one rail can easily be moved past the switches of the other rail. The distance between the end position switches when located at the rail ends and thus the length of the rails can be for example a little more than one meter.

A photo cell device 36,37 is supported by the slide 21, the ray of said photo cell device passing through openings 38,39 in the side walls 17,18 and above the chains 14 in the rails 13. A further photo cell device 40 only schematically indicated in FIG. 1 is provided, the ray of which passing through the gap 6 between the roller conveyor 4 and the chain conveyor 5. For their operation at least most of the movable parts of the device are connected in some suitable way to electronic control means not shown having relays and the like and preferably a computer, and also a control desk 42 with buttons as indicated in FIG. 1. At the saw blade 7 there are operable clamping means for holding a piece of lumber during the cutting. However these means do not constitute any part of the present invention and are therefore not illustrated or described.

The device described above has the following function. A piece of lumber, which is to be cut into shorter pieces, is fed on the chain conveyor 1 to the end stop 2, whereafter the piece of lumber is moved down onto the roller conveyor 4 and the end is clean cut by the saw blade 7. At the same time the computer has determined a suitable length for the cut off pieces depending on the length of the piece of lumber according to a program, so that the waste lumber will be minimized. Depending on the determined length of the cut off pieces a suitable end position switch is made sensitive to the actuating means 31. When said means 31 comes into contact with the activated end position switch, the displacement of the slide 21 is stopped and the slide will be locked in this position, and the end stop arms 23 will be swung up, if they are not already swung up.

As the piece of lumber from the roller conveyor 4 is thereafter fed on the chain conveyor 5, whereby the tooth wheels 16 effectively engage in the piece of lumber to displace it, the piece of lumber will come agains and be stopped by the end stop arms 23. When the end of the piece of lumber comes against the end stop arms 23, the impact energy developed will be absorbed partly by the stop edges of the end stop arms, said stop edges being blunt and preferably somewhat bent in the vertical plane as shown in FIG. 2, being pressed a little into the end of the piece of lumber, and partly by the vibration damping means 30 instantaneously being somewhat pressed together. Hereby the piece of lumber is prevented from rebounding. The clamping means at the saw blade 7 will seize the piece of lumber and the saw blade 7 will be moved in its own plane to cut a piece of the piece of lumber. Thereafter the clamping means will set the piece of lumber free. The end stop arms 23 are thereafter swung down and the chain conveyor 5 will remove the cut off piece. As thereafter there is no piece of lumber in front of the photo cell device 36,37, the end stop arms 23 are swung up and will again in the earlier or in a new position, stop a piece of lumber fed against them. When the piece of lumber has been cut, this will be registered by the computor, whereafter the next piece of lumber can be moved to the roller conveyor 4, provided that also the photo cell 40 indicates that no part of the preceding piece of lumber is left in the gap 6. If however for example one of the ends or a cut off piece of a piece of lumber is stuck in the gap 6 there will be no such indication from the photo cell 40, whereby the moving of a new piece of lumber to the conveyor 4 will be prevented. The next piece of lumber, that is moved to the roller conveyor 4, will also be treated in the way described above. By most of the end position switches 34 and by manual adjustment of them along the rails 32, 33 several different lengths for cut off pieces can be obtained. Hereby it is possible to let the lengths of the cut off pieces vary within the total operation length, for example a little more than one meter, of the end position switches. The electronic means can be such that the slide 21 with the end stop arms 23 and the actuating means 31 is moved the shortest way to its new position, or the movement can be made from a certain initial position.

It is not necessary that the whole device is controlled by the computer. Instead the operator can control the device from the control desk 42 for cutting of pieces of desired lengths. In this case the operator will have to visually determine the length of the pieces of lumber, and there may be for example a measurement rod along the conveyor for determining where to cut.

Thus it is possible by the device according to the invention easily and fastly to cut a piece of lumber into several equally or unequally long cut off pieces and at the same time to minimize the lengths of the waste pieces.

The invention is not limited to the embodiment described and illustrated in the drawings, as it can be varied within the scope of the invention. For example the shape of the parts of the end stop means engaging the ends of the pieces of lumber can vary, and said parts can be movable in way of the ends in different ways, for example horizontally. The end position switches can be supported in various ways. The end position switches can be replaced by other means for determining the different positions for the slide with the stop means 23.

What I claim is:

1. A device having a conveyor with a carrying plane for longitudinal feeding of pieces of lumber against an end stop device with means for adjusting the distance between said end stop device and saw means for cutting off a piece of lumber into several pieces, said end stop device adjusting means comprising:

a slide located under the carrying plane of the conveyor;

a hydraulic device for displacing said slide along a pair of guiding means arranged in the longitudinal direction of the conveyor;

stop means having at least two spaced arms for cooperation with, in the transport direction, the front end of the piece of lumber;

said stop means supported by a horizontal shaft mounted on said slide; and said horizontal shaft rotatable by hydraulic means for swinging said stop means arms between a first stopping position above said carrying plane and a second position below said carrying plane of the conveyor.

2. A device according to claim 1 wherein said slide carries actuating means;

at least one end position switch for cooperation with said actuating means arranged movably in the longitudinal direction of the conveyor and securable in optional positions; and said end position switch, said hydraulic device, and said hydraulic means being controlled by electronic control means operable by one of a computer or a manual control desk.

3. A device according to claim 2 wherein:

said end position switches are displaceably supported by two rails, said end position switches on one rail displaceable along said rail independent of the end position switches on the second rail, said rails being disposed parallel to the guiding means of the slide.

4. A device according to claim 3 wherein;

a photocell device is supported by the slide and is operating across said carrying plane and a second photocell device is located at the end feeding end of the conveyor and is operating across the transport plane to ascertain when a piece of lumber is preset at either photocell device, both of which photocell devices are connected to said electronic control means.

* * * * *